Dec. 16, 1958 — E. M. BARBER ET AL — 2,864,347
INTERNAL COMBUSTION ENGINE
Filed July 5, 1957 — 3 Sheets-Sheet 1
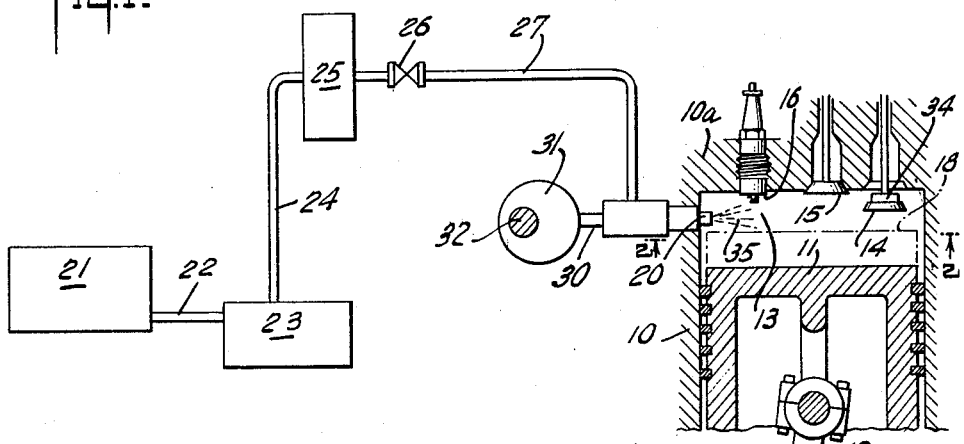
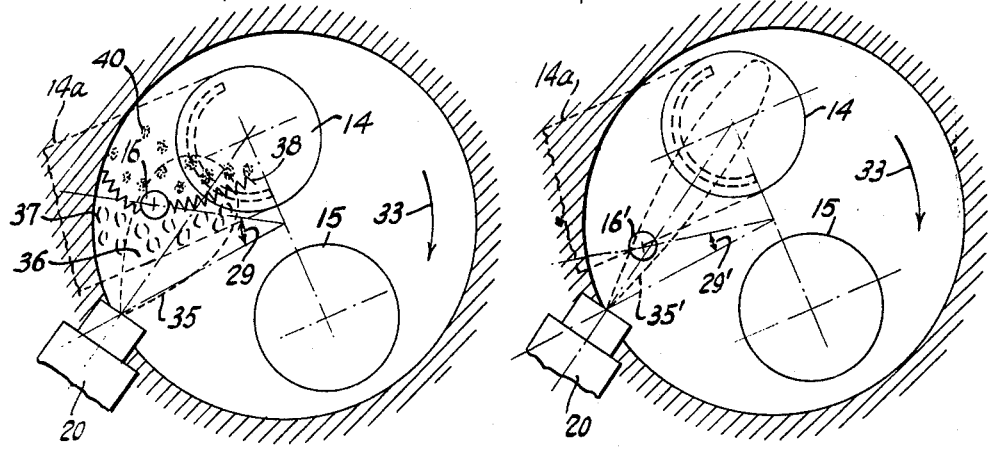
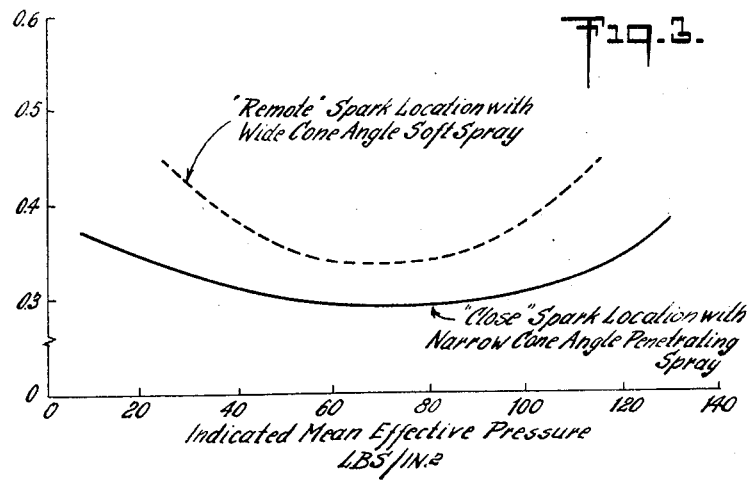

United States Patent Office 2,864,347
Patented Dec. 16, 1958

2,864,347

INTERNAL COMBUSTION ENGINE

Everett M. Barber, Wappingers Falls, and Charles W. Davis, Fishkill, N. Y., assignors to The Texas Company, New York, N. Y., a corporation of Delaware Application July 5, 1957, Serial No. 670,227

11 Claims. (Cl. 123—32)

This invention relates generally to an internal combustion engine, specifically in combination with fuel injection means and an ignition source located relative thereto in a combustion chamber therein, and particularly as applied to the engine and the method of operating the same as disclosed and claimed in U. S. Patent No. 2,484,009, issued October 11, 1949 to Everett M. Barber.

This application is a continuation-in-part of the sole applications of E. M. Barber, Ser. No. 470,308, filed November 22, 1954, and Ser. No. 507,837, filed May 12, 1955, both now abandoned.

In accordance with the disclosure in the above cited Barber patent, an improved combustion process is carried out within an engine in a manner such that knocking will not occur, irrespective of the octane or cetane number of the fuel employed, or the compression ratio, or the fuel-air mixture ratio used. This is accomplished by preventing fuel from mixing with that portion of the air within the combustion space of an engine cylinder, which normally would form the combustible so-called "end gases," so that the advancing flame front traps and compresses incombustible gases only.

In the preferred embodiment of the disclosure in the cited patent, air unmixed with fuel (or air containing insufficient fuel to support combustion) is introduced into and caused to swirl around the engine combustion chamber at a controlled rate with respect to the engine speed. Fuel under pressure is injected into the swirling air during each engine cycle to form a combustible fuel-air mixture adjacent the point of ignition. The increment and direction of the fuel injected during the period from injection to ignition is so controlled that the fuel mixes with only a localized portion of the air within the engine combustion chamber to form a localized combustible mixture, which is ignited immediately by spark or other suitable means and establishes a flame front. This combustible mixture is confined on its upstream side by air swirling toward it and containing little or no vaporized fuel and so is incombustible; and on the downstream side, the mixture is confined by products of combustion traveling away from the flame front at the edge of the mixture, where burning occurs substantially as fast as a combustible mixture is formed, so that combustion is confined to the leading edge of the mixture.

The injection of fuel is continued during the balance of the injection period into a narrow zone or zones of the combustion chamber immediately in advance of the flame front in its direction of burning. Thus, during each cycle of the engine operation, combustible mixture is formed progressively and consumed in a localized area in the combustion chamber. As a result, little or no combustible "end gases" are permitted to exist, and should they become existent, are not exposed to combustion chamber pressure and temperature for the time required for spontaneous ignition to occur. Consequently, knocking is inhibited even with the use of fuels of low antiknock values at high compression ratios.

It is an object of the present invention to provide an improved non-knocking type of internal combustion engine.

It is another object of invention to provide an improved internal combustion engine for non-knocking operation wherein the combustion duration is shortened.

A still further object of invention is to provide for more reliable non-knocking internal combustion engine operation.

Still another object of invention is to provide for more regular spark ignition over broader speed and load ranges in non-knocking engine operation.

A further object of invention is to ignite and burn leaner fuel-air mixtures more efficiently in non-knocking engine operation.

Another object of invention is to provide for improved ignition to more readily tolerate the changes in fuel sprays resulting from differences in manufacture and deterioration.

These and other objects of invention will be apparent from the following description when read in conjunction with the accompanying drawings wherein:

Fig. 1 is a diagrammatic illustration of an engine cylinder with several of its operating appurtenances.

Fig. 2a is an enlarged sectional diagrammatic view taken along line 2—2 of Fig. 1, illustrating the previously disclosed and preferred position relationship between the fuel ignition and fuel injection means, and the type of non-knocking combustion which occurs in the internal combustion engine disclosed in the Barber patent, the approximate shape of the fuel spray being shown in dotted outline, and the valve positions and sizes being shown in operational relationship.

Fig. 2b is a view similar to Fig. 2a showing the newer and closer position relationship between the fuel injection and fuel ignition means, showing the approximate shape of the narrower and more penetrating fuel spray in dotted outline, and omitting the showing of the flame front.

Fig. 3 is a graph illustrating certain engine performance characteristics of the present invention, as disclosed in Fig. 2b, in comparison with those from a similar engine operating as disclosed in Fig. 2a;

Figure 5:
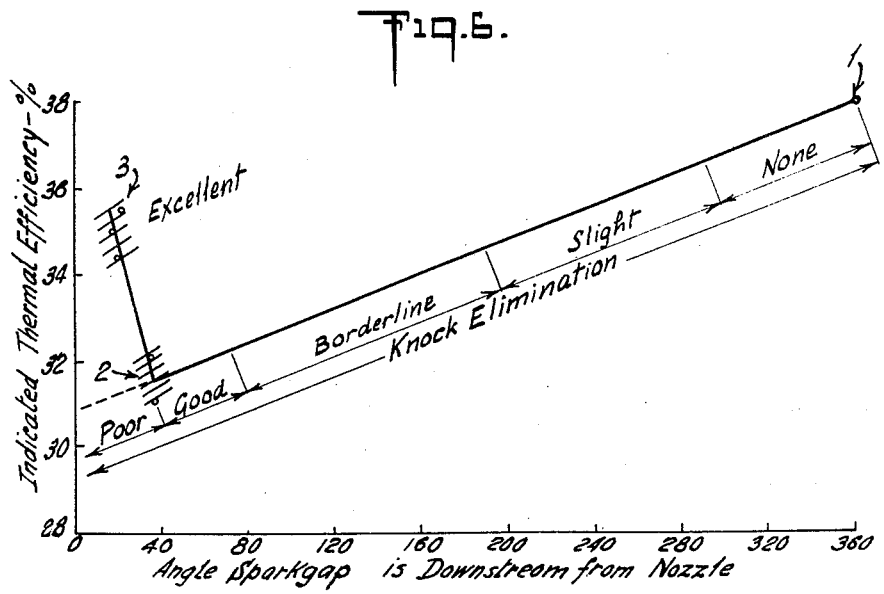
Figure 5A:
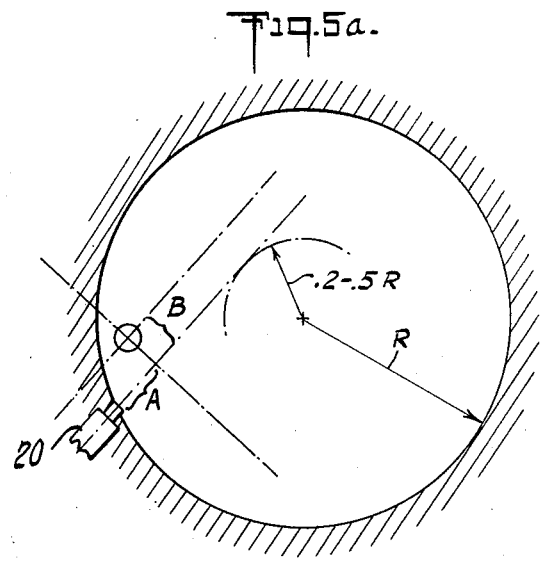
Figure 5B:
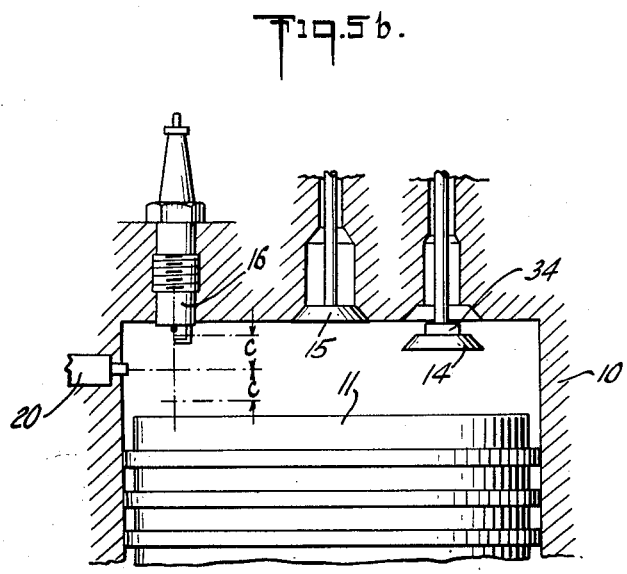

Figs. 5a and 5b are plan and elevation sectional views respectively of an engine cylinder disclosing the limits of the position of the ignition means with respect to the fuel injection means for the practice of our invention; and Fig. 6 is a graph illustrating the improved engine performance as the placement of the fuel ignition means with respect to the fuel injection means is diminished over that disclosed in Fig. 2a.

The present invention is distinguishable from that of the above noted patent by positioning the igniting means very much closer to the source of the injected fuel than had been done previously, in combination with a fuel injection means producing a narrower cone angle, more penetrating fuel spray, to produce unforeseen and surprisingly better results.

Narrow and wide cone angle sprays, as referred to herein, are defined as those having ranges of 5° to 25° and of 35° to 60° respectively. This cone angle is the angle measured between two straight lines extending outwardly from the nozzle spray orifice to each end of a line perpendicular to the fuel spray axis at a distance of one inch from the orifice and which measures the width of the spray at that point when observed under atmospheric conditions.

Spray penetration is an indication of the distance which the fuel spray will penetrate into the combustion chamber. A relative measure of penetrating ability is determined by observing the maximum distance from the injector nozzle orifice at which a 0.005" thick aluminum foil is deformed to fill the depressions in a waffle-like surfaced (or grid) backing plate, in which 0.036" wide crossed grooves are cut to a depth of 0.031" at a pitch of 0.071", when the grid backed foil is held in line with and perpendicular to the spray axis. Observations are made under atmospheric conditions at 900 injections per minute and at a fuel rate of 60 cubic millimeters per injection. Based on this method of measurement, as used herein, low penetrating or "soft" sprays have penetration values of 4 to 9 inches, and high (or more) penetrating sprays have values of about 15 to 25 inches. In general, narrow cone angle sprays will have high penetrations and wide cone angle sprays low penetration. Suitable velocity of propagation of the tip of the spray, as observed stroboscopically under similar conditions, is such that the spray tip travels one-half inch for each degree of rotation of the engine crankshaft.

Referring to Fig. 1, the engine cylinder is indicated at 10, with piston 11 and connecting rod 12, which runs to the usual crankshaft, not shown. The cylinder head 10a, in combination with the piston, defines combustion chamber 13. The cylinder head is equipped with intake and exhaust ports controlled respectively by an intake valve 14, and an exhaust valve 15, and an opening for receiving a fuel ignition means shown as spark plug 16, connected to a suitable ignition system, also not shown. Communicating with the intake port is an air intake pipe or manifold which may contain a customary air filter; and communicating with the exhaust port is an exhaust pipe which may contain a muffler, the structures other than the intake and exhaust ports not being shown in this figure.

A fuel injection means 20, shown diagrammatically, extends through an opening in the cylinder wall, and as disclosed, is directed to discharge into the combustion chamber, generally tangentially to the circular direction of air swirl. Fuel from a suitable source of supply such as tank 21 is drawn through line 22 by fuel pump 23, driven by the engine. The fuel pump forces the fuel under pressure through line 24 into an accumulator tank 25, from where it passes through a check valve 26 in line 27 leading to the injection means 20.

Suitable means for regulating the quantity of fuel injected and the time of fuel injection in relation to the engine cycle may be employed. As diagrammatically illustrated, the fuel injection means 20 is equipped with a valve 30 having a valve stem operated by cam 31 carried by cam shaft 32, which is interconnected to be driven by the engine in a conventional manner. Cam 31 may be adjusted relative to the piston stroke to control the time of fuel injection or injection advance, and adjusted relative to the valve stem to control the length of time of opening of the valve 30, thereby regulating the rate of fuel injection and the amount of fuel injected on each stroke respectively. As controls for this purpose are well known, no further illustration thereof is thought necessary.

Referring to Figs. 2a and 2b, the air intake pipe 14a, leading to the intake port is so directed and the intake valve 14 is equipped with a shroud 34, so positioned in relation thereto, as to direct the incoming air in a direction to produce a swirling movement of the air within the combustion chamber or space, as indicated by the arrows 33. In operation, a charge of air unmixed with fuel (or containing less than that amount of fuel which will support combustion) is drawn into the cylinder on the suction stroke of the piston 11. This air (or dilute fuel-air mixture) is then compressed on the compression stroke of the piston, the swirling movement being continued.

Near and generally somewhat before the position of top dead center of piston travel, as indicated by the dotted line 18 in Fig. 1, an increment of fuel is injected from the fuel injection means 20, tangentially into the swirling air, to bring the edge of the spray close to the spark gap between the electrodes of spark plug 16. The spray from injection means 20 is such as to uniformly impregnate the swirling air as the latter passes. The spray is atomized in the shape as indicated at 35, so that it begins to vaporize and mix with the swirling air to form the ultimate combustible mixture. As evident from Fig. 2a, the fuel is aimed along a chord of the combustion space. As the spray moves outwardly to the zone indicated by the numeral 36, the swirling air causes a circumferential distribution of fuel vapor, as indicated at 37, facilitating the proper mixing of the vaporized fuel with the swirling air and tending to produce a uniform mixture. The region in the zone 36 of spray 35 therefore constitutes the region of impregnation of the air with the fuel, and so the region of formation of a combustible fuel-air mixture.

Just as or very shortly after the first increment of injected fuel reaches the location of the gap of spark plug 16, by which time it has formed a combustible fuel-air mixture with the swirling air, a spark between the electrodes of plug 16 ignites this mixture, establishing a flame front as indicated at 38. The positioning of injection means 20 and the initial fuel spray produced by this means are such that the electrodes of the plug are within a combustible fuel-air mixture, whereby ignition of this first increment of entering fuel is insured.

The fuel ignition means (spark plug 16) is spaced from the injection means 20 a sufficient distance downstream to permit the formation of an ignitible mixture during the intervening travel of the injected fuel, while at the same time the plug 16 is sufficiently close to injection means 20 to prevent the accumulation within the combustion space of any substantial amount of combustible mixture prior to ignition. In the particular arrangement shown in Fig. 2a, employing a cylinder having a bore diameter of 3¼ inches, good results were secured using a wide cone angle "soft" spray with the included radial angle 29, between the radii passing through the spark gap of plug 16 and through the orifice of the injection means 20, varying from about 30° to 90° and preferably from about 30° to 45°. In general, in the prior art, as exemplified by the above noted Barber patent, it can be stated that the included angle 29 should be greater than about 20° and less than about 135°.

With such an arrangement, the fuel-air mixture is ignited almost as soon as it is formed and before an opportunity is afforded for the injected fuel to mix with air throughout any substantial extent of the combustion space. The net result is that a combustible mixture is produced only within a localized zone of the combustion space adjacent the plug 16, and this mixture is surrounded by incombustible air or gas on one side and by an incombustible fuel-rich mixture on the other. Thus, at the beginning of ignition, there has been insufficient time for the formation of a combustible mixture within the combustion space to cause knock. The established flame front 38 tends to travel toward the injection means 20 but the high swirling movement of the air and other gases within the combustion space coupled with the incombustible fuel-rich mixture near the injection means, tend to counteract actual relative movement of the flame front with respect to the cylinder wall, fuel injection means, and ignition means or plug.

During the continuance of that portion of the compression or combustion stroke or both, which falls within the period of fuel injection, additional fuel is injected toward the flame front 38 and is mixed with fresh quantities of the swirling air to form combustible mixture which is ignited and burned as it reaches the flame front. It will be noted that the combustion of this additional fuel-air mixture takes place almost as rapidly as formed, and that no opportunity is given for unburned fuel to become disseminated widely through the combustion space. The first portions of fuel-air mixture, which are burned rapidly at the flame front, become incombustible exhaust gases, indicated at 40, which continue the swirling movement around the cylinder. Consequently, even if the period of fuel injection is continued until substantially all of the air within the cylinder is consumed, the last volume of combustible mixture formed is still bound by incombustible exhaust gases. Where the period of fuel injection is terminated prior to consumption of all the air, the last combustible mixture formed is confined on the front side of its swirling movement by the burnt mixture or exhaust gases and on the rear side by an incombustible mixture of air. Thus, combustion to develop the power required on each stroke is accomplished while avoiding the formation of highly heated end gases of combustible fuel-air mixture trapped by the flame front, so that no opportunity is presented for the occurrence of spontaneous ignition with resultant knock. Also, since the fuel is ignited almost instantly after injection and burned substantially as fast as it is injected, there is no problem of an uncontrolled pre-ignition.

In further study on the initiation and propagation of the flame in the non-knocking combustion process disclosed in the above noted patent to Barber, it was found that by using a fuel injector which provided a narrow cone angle, penetrating spray and placing the gap between the spark plug electrodes very much closer to the fuel injection means than had been done previously, the engine performance was improved and was more reliable to produce knock-free operation.

These changes in spark gap positions and the spray shapes are disclosed in Figs. 2a and 2b and required moving the spark gap from a position one inch from the fuel injector orifice and well downstream of the spray center line to within five-eighths of an inch of the orifice and just off the spray center line, the latter being the position shown in Fig. 2b, wherein the identical enumeration as that indicated in Fig. 2a is used, the difference in the two figures being the positions of the spark plug gap indicated diagrammatically at 16, and 16', with the central angle 29, Fig. 2a, now being indicated as 29' in Fig. 2b, and the shape of the fuel spray 35, Fig. 2a, now being indicated as 35', in Fig. 2b.

In the relative positioning of the fuel ignition and fuel injection means as disclosed in Fig. 2a, the angle at 29 varies usually between 30° and 45°, and as noted above has range limits of 20° and 135°. In the relative positioning of the fuel ignition-fuel injection means as disclosed in Fig. 2b, the central angle at 29' is much below the normal range of 30°-45° used in Fig. 2a, and is even below the lower limit of 20° noted, the usual value thereof being approximately 15° with a range of values from 12° to less than 20° for a 3¼" bore cylinder.

The improved method of locating the spark gap with relation to the source of fuel injection is independent of the cylinder bore and the central radial angle between the radii passing through the fuel injector orifice and the spark gap which would vary with cylinder size. An improved procedure for the location of the spark gap in relation to the source of fuel spray is discussed below.

In the operation of the patented non-knocking engine, the use of more penetrating sprays allows the fuel to be distributed into air that has already passed the nozzle at the time of injection. This "catching up" effect permits mixing of the fuel and air in a shorter time with a shorter injection duration thereby decreasing the combustion duration and so increasing engine efficiency without any increase in air swirl rate.

In non-knocking engine operation, the maximum allowable time interval between initial injection and ignition is limited by the tendency for the first injected fuel to undergo "end gas" reactions leading to knock, on some fuels. Decreasing this time interval by decreasing travel distance by locating the spark gap closer to the nozzle orifice will further minimize this knock tendency. The new spark gap location also permits the use of the narrower cone angle fuel sprays which produce higher penetration. This improved combination of spray shape and spark gap position is conducive also to improved part-load fuel economy and operability.

Fig. 3 is a graph of comparative results of runs with the same engine having the spark gap in the old and new positions relative to the fuel injector spray axis, at the same rate of speed.

As shown, the indicated mean effect pressure in pounds per square inch is plotted as abscissae against the indicated specific fuel consumption in pounds per indicated H. P. hour plotted as ordinates. The broken curve shows the values obtained when operating with the prior art spark gap position with a wide cone angle "soft" spray, while the full line curve indicates the improved performance and economy obtained from using a fuel injection means which produces a narrow cone angle penetrating spray and locating the spark gap in accordance with the present invention.

Figure 4A:
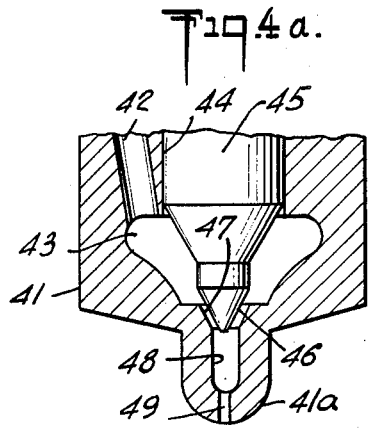
Fig. 4a is an enlarged longitudinal sectional view through a portion of the nozzle tip and associated valve of a drilled hole type of fuel injector.

These narrow penetrating fuel sprays can be obtained by the use of drilled hole type injection nozzles with either conical or flat seat type of valves or by the use of pintle type nozzles with valves which may open inwardly or outwardly. Referring to Fig. 4a, there is disclosed a partial view of the tip portion of a drilled hole type fuel injection means or nozzle, with the nozzle body indicated at 41, containing the fuel inlet passageway 42, ending at an enlarged fuel pressure chamber or sump 43. The nozzle body also includes an axial bore 44 for slidably receiving a needle valve 45, which is formed with a conical seating surface 46 adapted to cooperate with the conical valve seat 47 leading from the sump 43 to the fuel passage 48, which communicates with the drilled hole spray orifice 49 in tip extension 41a.

Figure 4B:
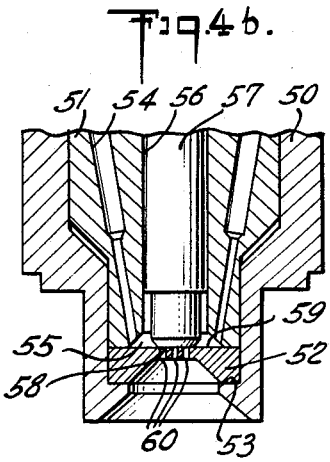
Fig. 4b is an enlarged longitudinal section view through a portion of the nozzle tip and associated valve of another drilled hole type of fuel injector.

Referring to Fig. 4b, there is disclosed a partial view of the tip portion of a drilled hole type, flat seat fuel injection means or nozzle. The tip portion of the nozzle comprises a nozzle nut 50, with an axil bore for housing the nozzle body 51 and orifice plate 52, which is seated on the shoulder 53 of nut 50. The nozzle body 51 includes a fuel inlet passageway 54, leading to a fuel pressure chamber or sump 55, and an axial bore 56 for slidably receiving the valve 57, having a flat seating surface at 58, which is adapted to cooperate with the flat valve seat at 59 on the orifice plate 52.

In accordance with fuel requirements, the orifice plate 52 may contain various numbers of orifices or holes and is indicated with a plurality of drilled holes 60, their number and size being determined by the fuel capacity desired, considering the orifice coefficient, and may be reduced to one in number. These drilled holes 60 are shown as parallel but they may be at any desired angle to the flat seat to get the predetermined spray angle. Similar fuel requirements when using the nozzle tip of Fig. 4a are satisfied by the provision of additional orifices 49.

Figure 4C:
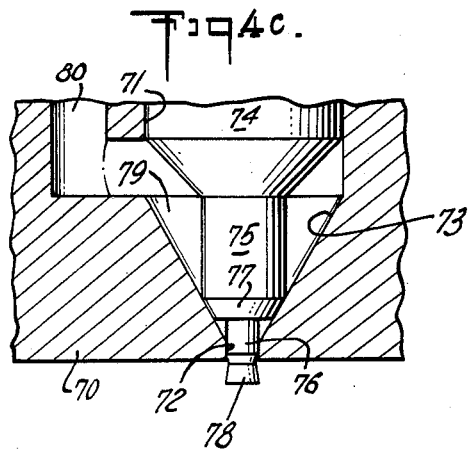
Figs. 4c and 4d are similar sectional views of pintle type injector nozzles showing respectively inwardly and outwardly opening valves.
Figure 4D:
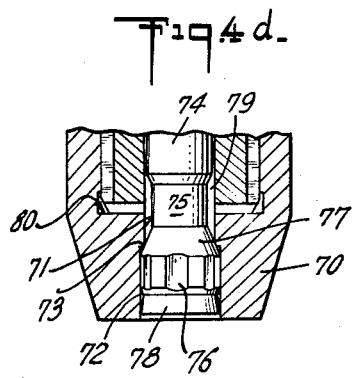

Figs. 4c and 4d show partial views of the tip portions of pintle type fuel injector means and since the basic difference between them is the direction of operative motion of the pintle valve, identical numeration will be used. In each instance, the nozzle tip is shown at 70, having a central bore at 71, and a counterbore at 72, joined to each other by a conical valve seating surface 73. The valve stem 74 has a reduced extension 75 which in turn supports the pintle 76 by means of the conical valve surface 77 which cooperates with the seating surface 73 to control the flow of fuel. The outer end of the pintle may be cylindrical and is shown as having an obtuse conical surface, indicated generally at 78, which determines the spray shape of the injected fuel, the extent of the obtuse angle depending on the angle of the spray desired. The reduced extension 75 in combination with the central bore and the valve seat provides a fuel pressure chamber or sump 79, with the fuel inlet passageway indicated at 80.

Since the specific coupling means by which the tip portion is joined to the holder of the injection nozzle in each type of fuel injector means disclosed herein, is old in the art, disclosure of the same is omitted. With the use of fuel injection means or nozzles, which produce narrow cone angle, penetrating sprays, and are obtainable from the types disclosed in Figs. 4a, 4b, 4c and 4d, experiments have shown that with the same air swirl rate, the optimum injection duration is shortened as compared with the previous operation with "soft" sprays, the combustion duration is shortened also and the thermal efficiency improves.

While the positioning arrangement of Fig. 2b is applicable particularly to an engine having a cylindrical disk type combustion chamber with a cylinder bore diameter of 3¼ inches, so that the central angle at 29' has a value less than 20°, other desired spark gap-fuel injection nozzle arrangements for different bore diameters or combustion chamber shapes to attain the advantages of the present invention are possible, provided the spark gap is located within certain limits or loci. Figs. 5a and 5b disclose specifically the limiting locations of a spark gap with relation to the fuel injection axis without regard to the bore diameter.

The spark gap should be spaced inwardly of the engine cylinder wall in a plane perpendicular to the static or neutral center line of the fuel spray spaced from the orifice of the injection nozzle at a distance indicated as A, Fig. 5a; and thence in this plane in the direction of and parallel to the air motion in the combustion chamber a distance from this center line indicated as B, Fig. 5a; and thence still in the same plane perpendicular to the distance indicated as B a distance indicated as C, Fig. 5b. The inward spacing of the plane along the static center line of the fuel spray, indicated as A in Fig. 5a, has the range limits of from 0.35" to 0.70" from the nozzle orifice; the downstream distance in this plane, indicated as B in Fig. 5a, has the limits of from 0.10" to 0.40"; and the further spacing from this distance in this plane indicated as C, Fig. 5b, has the range limits of from 0.0" to 0.25". The static center line of the fuel spray is directed to be tangent to a circle, the radius of which ranges from 20% to 50% of the radius of the combustion chamber for the case of a cylindrical disk combustion chamber. Determination of the location of the spark gap with respect to the injection nozzle orifice and the static center line of the fuel spray, within the limits of A, B and C as set forth above, will result in its proper positioning to achieve the objects of our invention.

Referring to Fig. 6, the plot on the graph highlights, for full load operation, the unexpected and abruptly favorable change in thermal efficiency resulting from the use of injectors providing narrow cone angle penetrating sprays with a close positioning of the ignition means, as the relative angular spacing between the positions of the ignition means and fuel injection means is decreased below the zone of 30°–40° values.

Referring to the graph, the point indicated at 1 is for 360° angular spacing and has the highest thermal efficiency, showing good fuel-air mixture (largely premixed), with the combustion operation approaching the Otto-cycle. At this value, the duration of combustion is short and is independent of injection duration, extending from 30°–40° of crank angle motion, but engine operation at this spark gap-fuel injector angular situation is restricted to use with high octane fuels, with the tendency of engine knock due to "end gas" reactions at a maximum.

Among the advantages of the non-knocking combustion process of the above noted Barber patent, is the ability of the process to use multi-purpose fuels for engine operation. But tied to this is decreased thermal efficiency, because of the longer duration of combustion. The thermal efficiency approaches Otto-cycle efficiency as a limit, depending on the air swirl rate used and the resulting combustion duration. Referring to the region indicated at 2, the 30°–40° zone of angular spacing on the graph, during the patented non-knocking combustion process with an air swirl rate of 6, and a corresponding injection duration of 60°, the combustion duration would be 60° (or about twice that at the angular spacing of 360° (Otto-cycle). In this cited zone, the duration of combustion is controlled by the supply of fuel, with the burning in the cylinder no faster than the supply of fuel to and the acceptance of fuel by the swirling air; for if the fuel is injected too fast, the resultant mixture tends to become too rich and part of the swirling air is missed for mixture with the fuel; and conversely, when the fuel injection is too slow, parts of the resultant fuel-air mixtures are too lean and unburned fuel is discharged with the exhaust. An increase in thermal efficiency in region 2 could be achieved by an increase in air swirl rate which would lead to a loss in high speed volumetric efficiency.

The angular spacing between the spark gap and the fuel injector means in the practice of the patented non-knocking combustion process is restricted to the lower limit of greater than 20° and preferably about 30°–40°. Extrapolation of the plot of the graph indicates a further decrease in thermal efficiency as the limits of angular spacing between the fuel injector and spark gap are lowered, as indicated by the dotted line in Fig. 6.

Consequently, the prior art practice of using a wide cone angle "soft" spray and an approximate 30° angular spacing between the ignition means and fuel injector nozzle did not justify a further reduction in the angular limits of their spacing. Also, the zone between 30°–45° angular spacing produced satisfactory non-knocking combustion as compared with either end of the plotted (and dotted) straight line on the graph.

It was not until after the use of suitably sized and reliable fuel injection nozzles which provided the narrower, more penetrating fuel spray shapes, which would more rapidly impregnate the swirling mixtures without an increase in air swirl rate, were results obtained to show that it was advantageous to diminish the angular limits between the spark gap and the source of fuel injection, as indicated by the plot at 3 in the zone at about 20° angular spacing. The combustion duration becomes shorter because the more penetrating fuel spray shapes reduce mixing time, since the spray propagates further into the swirling air so that it catches up with some of the air and impregnates all of it with fuel in less than the time for one air swirl. In this case, for an air swirl rate of six, complete mixing is accomplished with an injection duration of about 45°, resulting in a 25% reduction in combustion duration and improved thermal efficiency.

The combination of a fuel injector providing a narrow, penetrating fuel spray, with the closer position of the spark gap with respect to the source of fuel injection, results in increased power and reduced fuel consumption with respect to the plot in a zone 30°–40° angular spacing, due largely to a shortened period of combustion, the gain in performance being shown clearly in Fig. 3.

Obviously, many modifications and variations of the invention, as hereinbefore set forth, may be made without departing from the spirit and scope thereof, and therefore only such limitations should be imposed as are indicated in the appended claims.

We claim:

1. The combination in an internal combustion engine comprising a cylinder having a piston operating therein and defining a combustion space, intake means for said cylinder for introducing air into said combustion space and for imparting a high velocity swirl thereto, fuel injection means carried by said cylinder for providing fuel to said combustion space, means for supplying fuel thereto whereby a portion of the first increment of injected fuel forms with a localized portion of the swirling air in said cylinder a combustible fuel-air mixture adjacent said fuel injection means, a spark ignition device mounted on said cylinder and having electrodes extending into said combustion space sufficiently close to said fuel injection means and the fuel injected therefrom so that said combustible fuel-air mixture formed from said localized portion of said swirling air with said first increment of injected fuel envelopes the spark gap between said electrodes substantially as soon as said combustible fuel-air mixture is formed, means coordinated with engine operation for controlling the start of injection of fuel from said fuel injection means during the latter part of the compression stroke of said piston, means synchronized with engine operation for producing a spark of igniting intensity at said spark gap between said electrodes at the time said combustible fuel-air mixture reaches said spark gap to initiate combustion and establish a flame front traveling in the direction opposite that of said swirling air, and means for controlling the rate and duration of injection of fuel following ignition to impregnate shortly in advance of the traveling flame front additional quantities of said swirling air to form progressively additional combustible fuel-air mixture immediately in advance thereof for burning substantially as rapidly as formed to provide the power required on each cycle, whereby the formation of sufficient end gases consisting of combustible fuel-air mixture trapped by said flame front to cause spontaneous ignition and produce knock is prevented, said spark gap between said electrodes of said spark ignition device being positioned in a plane which is normal to the static center line of the fuel spray from said fuel injection means and located between 0.35" and 0.70" from the orifice thereof and in this plane in the direction of swirling air movement a distance between 0.10" and 0.40" from said center line, and in the same plane at right angles to this last mentioned distance not more than 0.25", said fuel injection means being of the type comprising a nozzle which produces a narrow angle penetrating spray, said angle varying between 5° and 25°.

2. In the combination as defined in claim 1, said fuel injection means comprising an injector nozzle of the drilled hole type.

3. In the combination as defined in claim 1, said fuel injection means comprising an injector nozzle of the pintle valve type.

4. The combination in an internal combustion engine according to claim 2 wherein said fuel injection means comprises a body portion with a fuel pressure chamber and fuel supply passage leading therefrom, a conical valve seating surface leading from said chamber to said passage, and a valve slidably supported in said body portion for contacting said valve seating surface to close off said supply passage.

5. In the combination as set forth in claim 2, said fuel injection means comprising a fuel injector nozzle body having a fuel inlet passage and an axial bore in communication therewith, an orifice plate cooperating with said body for closing the end of said bore to form a chamber therewith, and a valve slidably mounted in said bore, said orifice plate having a flat valve seat on its surface open to said chamber and an opening leading from said valve seat, said valve being positioned in operative relationship with said seat for controlling fuel injection.

6. In an internal combustion engine, a cylinder with a piston operating therein providing a combustion chamber, means for introducing air into said combustion chamber and for imparting a high velocity swirl thereto, injection means carried by said cylinder for injecting fuel into said combustion chamber so that an increment of injected fuel forms with a localized portion of swirling air therein a combustible fuel-air mixture adjacent said injection means, said last mentioned means being positioned to inject fuel in a tangential direction into said combustion chamber and in the direction of air swirl, a spark ignition device mounted on said cylinder having its electrodes projecting within said combustion chamber and downstream of said injection means so that said combustible fuel-air mixture resulting from said increment of injected fuel contacts said electrodes substantially as soon as said combustible mixture is formed, the central angle at the cylinder axis between the radii passing through the orifice of said injection means and the spark gap between said electrodes of said ignition device being less than 20°, means coordinated with engine operation for controlling the start of injection of fuel from said injection means during the latter part of the compression stroke of said piston, means synchronized with the engine operation for producing a spark of igniting intensity at said gap between said electrodes at the time said combustible fuel-air mixture formed from said increment of injected fuel reaches said spark gap to initiate combustion and establish a flame front traveling in the opposite direction with respect to said swirling air, and means for controlling the rate and duration of injection of fuel following ignition to impregnate shortly in advance of the traveling flame front additional quantities of said swirling air to form progressively additional combustible fuel-air mixture immediately in advance thereof for burning the same substantially as rapidly as formed to provide the power required on each cycle, whereby the formation of sufficient end gases consisting of combustible fuel-air mixture trapped by the flame front to cause spontaneous ignition and produce knock is prevented, said injection means being of the type which produces a narrow angle penetrating fuel spray, said spark gap being located in a plane normal to the static center line of the fuel spray from said injection means and spaced from the orifice of said injection means not less than 0.35" and not more than 0.70", and in this plane in the direction of and parallel to the air motion in the combustion chamber at a distance of at least 0.10" and not more than 0.40" from said axis and at right angle to this distance and in the same plane within the limits of 0.0" to 0.25".

7. In an internal combustion engine as set forth in claim 6, the central angle at the cylinder axis between the radii passing through said orifice of said injector means and through said spark gap of said ignition device being about 15°.

8. The combination in an internal combustion engine according to claim 6, wherein said injection means produces a spray having a cone angle not less than 5° and not more than 25°, and said orifice of said injection means and said spark gap between said electrodes being spaced from each other so that the included central angle between the radii passing through said orifice and through said spark gap is greater than 12° and less than 20° when the bore of said cylinder is 3¼" whereby said electrodes are contacted by combustible fuel-air mixture formed from said increment of injected fuel and which diffuses to the side of the spray immediately after injection and before the air swirl has swept the mixture substantially beyond said electrodes.

9. In the combination as set forth in claim 8, said injection means having a nozzle of the drilled hole type, a valve with a conical end, and a conical valve seating surface for receiving said end thereby to control fuel flow through said means.

10. In the combination as set forth in claim 8, said injection means comprising a pintle valve type of fuel injector.

11. The combination in an internal combustion engine according to claim 8, wherein said injection means comprises a fuel injection nozzle including an injector body, a valve member supported in said body, and an orifice plate having a flat seat for cooperating with said valve member, said injector body having an axial bore for receiving said valve member, said orifice plate having an opening for the passage of fuel therethrough leading from said flat seat and adapted to be closed off when said valve is seated on said plate.

No references cited.